(12) United States Patent
Jackson et al.

(10) Patent No.: US 8,711,857 B2
(45) Date of Patent: Apr. 29, 2014

(54) DYNAMIC FACSIMILE TRANSCODING IN A UNIFIED MESSAGING PLATFORM

(75) Inventors: James Jackson, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1035 days.

(21) Appl. No.: 12/286,458

(22) Filed: Sep. 30, 2008

(65) Prior Publication Data

US 2010/0079784 A1 Apr. 1, 2010

(51) Int. Cl.
*G06F 15/16* (2006.01)

(52) U.S. Cl.
USPC ........ 370/392; 370/466; 379/93.09; 709/231; 709/227

(58) Field of Classification Search
USPC ............ 370/352, 395.2, 466, 392; 379/93.09; 709/231, 227
See application file for complete search history.

(56) References Cited

U.S. PATENT DOCUMENTS

| | | | |
|---|---|---|---|
| 6,504,838 B1 | 1/2003 | Kwan | |
| 6,741,608 B1* | 5/2004 | Bouis et al. | 370/465 |
| 6,967,946 B1 | 11/2005 | Tackin et al. | |
| 7,002,919 B1* | 2/2006 | El-Sayed | 370/252 |
| 7,023,802 B2* | 4/2006 | Kawahata et al. | 370/235 |
| 7,082,143 B1 | 7/2006 | LeBlanc et al. | |
| 7,092,365 B1 | 8/2006 | Tackin et al. | |
| 7,161,931 B1 | 1/2007 | Li et al. | |
| 7,266,611 B2* | 9/2007 | Jabri et al. | 709/231 |
| 7,355,988 B1* | 4/2008 | Denbar et al. | 370/282 |
| 7,423,983 B1 | 9/2008 | Li et al. | |
| 7,681,038 B1* | 3/2010 | Dawson et al. | 713/168 |
| 7,801,160 B2* | 9/2010 | Noguchi | 370/401 |
| 7,881,294 B1* | 2/2011 | Croak et al. | 370/392 |
| 7,907,708 B2* | 3/2011 | Walker et al. | 379/93.09 |
| 8,010,828 B2* | 8/2011 | Choi et al. | 714/4.1 |
| 8,171,146 B2* | 5/2012 | Chen et al. | 709/228 |
| 8,553,700 B1* | 10/2013 | Dawson et al. | 370/395.2 |
| 2001/0001268 A1 | 5/2001 | Menon et al. | |
| 2001/0022784 A1 | 9/2001 | Menon et al. | |
| 2001/0036176 A1* | 11/2001 | Girard | 370/352 |
| 2002/0048268 A1 | 4/2002 | Menon et al. | |
| 2003/0112796 A1 | 6/2003 | Kwan | |
| 2003/0193696 A1* | 10/2003 | Walker et al. | 358/402 |
| 2005/0249196 A1 | 11/2005 | Ansari et al. | |
| 2006/0013194 A1* | 1/2006 | Baumann et al. | 370/352 |

(Continued)

FOREIGN PATENT DOCUMENTS

| | | |
|---|---|---|
| EP | 1 804 546 A1 | 7/2007 |
| EP | 1 804 546 B1 | 3/2008 |

(Continued)

OTHER PUBLICATIONS

"ITU-T: Procedures for real-time Group 3 facsimile communication over IP networks"; T.38 (Apr. 2007); 130 pages.*

*Primary Examiner* — Brian O'Connor
(74) *Attorney, Agent, or Firm* — Wolff & Samson, PC (57) ABSTRACT

Facsimile transcoding is dynamically invoked for devices that do not support T.38 fax protocol. In this way, a unified messaging platform can process facsimiles from endpoints that are not T.38 capable without using without digital signal processor resources. Dynamic fax transcoding can be performed at a session border controller, allowing transcoding resources to be engaged only for non-T.38 endpoints rather than for all calls on an interface.

4 Claims, 6 Drawing Sheets

(56) References Cited

U.S. PATENT DOCUMENTS

| | | |
|---|---|---|
| 2006/0133358 A1 | 6/2006 | Li et al. |
| 2006/0146792 A1 | 7/2006 | Ramachandran et al. |
| 2006/0227728 A1* | 10/2006 | Baumann .................... 370/260 |
| 2006/0239255 A1 | 10/2006 | Ramachandran et al. |
| 2006/0291450 A1 | 12/2006 | Ramachandran et al. |
| 2007/0019563 A1 | 1/2007 | Ramachandran et al. |
| 2007/0019625 A1 | 1/2007 | Ramachandran et al. |
| 2007/0025480 A1 | 2/2007 | Tackin et al. |
| 2007/0027975 A1 | 2/2007 | Tai et al. |
| 2007/0061397 A1 | 3/2007 | Gregorat et al. |
| 2007/0071221 A1 | 3/2007 | Allen et al. |
| 2007/0086582 A1 | 4/2007 | Tai et al. |
| 2007/0088836 A1 | 4/2007 | Tai et al. |
| 2007/0091873 A1 | 4/2007 | LeBlanc et al. |
| 2007/0153813 A1 | 7/2007 | Terpstra et al. |
| 2007/0155386 A1 | 7/2007 | Wahl et al. |
| 2007/0184096 A1* | 8/2007 | Ameri et al. ................. 424/449 |
| 2007/0291734 A1 | 12/2007 | Bhatia et al. |
| 2008/0168523 A1 | 7/2008 | Ansari et al. |
| 2008/0192760 A1 | 8/2008 | Baeder et al. |
| 2008/0285543 A1* | 11/2008 | Qiu et al. ..................... 370/352 |
| 2008/0317065 A1* | 12/2008 | Chen et al. .................. 370/469 |
| 2009/0097475 A1* | 4/2009 | Seon ............................ 370/352 |
| 2009/0109495 A1* | 4/2009 | Jackson ....................... 358/438 |
| 2010/0208723 A1* | 8/2010 | Olafsson ..................... 370/352 |

FOREIGN PATENT DOCUMENTS

| | | |
|---|---|---|
| EP | 1 956 854 A1 | 8/2008 |
| WO | WO 2006/073481 A1 | 7/2006 |
| WO | WO 2007/016447 A2 | 2/2007 |
| WO | WO 2007/016448 A2 | 2/2007 |
| WO | WO 2007/016472 A2 | 2/2007 |
| WO | WO 2008/067340 A2 | 6/2008 |
| WO | WO 2008/083470 A1 | 7/2008 |

* cited by examiner

DYNAMIC FACSIMILE TRANSCODING IN A UNIFIED MESSAGING PLATFORM

BACKGROUND OF THE INVENTION

The present invention relates generally to facsimile (fax) transcoding and more particularly to dynamic facsimile transcoding in a unified messaging platform.

Unified messaging is the integration of different streams of communication (e.g., email, voicemail, short message service (SMS), fax, etc.) into a single, unified message store (e.g., a unified messaging platform) accessible from a variety of user devices. In facsimile handling, when a fax call is forwarded to voicemail in a unified messaging platform, if the calling endpoint is a facsimile machine, the fax can be transferred to the unified messaging platform system and later accessed via other communications methods (e.g., email, web portal, etc.).

Generally, there exists two common mechanisms for real-time transport of faxes over Voice over Internet protocol (VOIP) networks—the G.711 ITU-T standard (referred to herein as G.711 fax or simply G.711) and the ITU standard T.38 (referred to herein as T.38 fax or simply T.38).

With G.711 fax, a fax call is treated the same as a voice call. Fax modems communicate directly through the G.711 real-time transport protocol (RTP) stream. Media Gateways are typically still required to disable silence suppression, disable echo cancellation, perform tone detection, and renegotiate the sessions to G.711 if higher compression codecs are in use (e.g., G.729).

There are several drawbacks to using G.711 fax. First, G.711 fax is very susceptible to timing errors in an Internet protocol (IP) network. A lost packet can cause fax modems to lose sync and drop the call. Second, G.711 is bandwidth intensive, using up to twenty times the bandwidth of an equivalent T.38 call. Third, G.711 is expensive to implement in a VOIP platform. G.711 fax requires dedicated digital signal processor (DSP) resources for decoding. A unified messaging platform processing G.711 fax therefore requires dedicated fax servers with DSPs.

In contrast, T.38 fax creates a higher-level protocol that abstracts the fax data from lower layers. T.38 fax is much more robust than G.711, supports reliable transport mechanisms (e.g., transmission control protocol (TCP)), and allows redundant data to be added in a user datagram protocol (UDP) mode. Additionally, T.38 is more tolerant of timing problems or errors in IP networks and utilizes considerably less bandwidth than G.711 fax. Furthermore, since T.38 provides fax data abstraction, it can be implemented on general-purpose media servers without the need for costly DSPs since G.711 decoding and analog T.30 fax processing are not required.

Unfortunately, there are a number of legacy devices still used in VOIP networks that do not support T.38 fax. Session border controllers (SBC) provide transcoding capabilities, but the transcoding policies must be statically configured. That is, a VOIP network connected to the SBC must be designated either as T.38 capable or as T.38 incapable. If designated as T.38 incapable, the SBC will transcode all calls from that network from G.711 to T.38. Transcoding is a complex and costly process that requires extensive DSP resources.

Accordingly, improved systems and methods for facsimile transcoding are required.

BRIEF SUMMARY OF THE INVENTION

The present invention generally provides methods for transcoding facsimile transmissions. In one embodiment, a call is received in conventional fashion at a server from a gateway using a real time protocol (RTP). The server detects facsimile tones and re-invites the gateway to transmit according to a first facsimile coding standard.

If a gateway is not capable of such a transmission, an error message is passed to the server by way of a border element. The server then passes a re-invitation to the border element with the first facsimile coding standard in the session description protocol. In at least one embodiment, the re-invitation includes a transcoding directive in a header. The border element then sends a re-invitation to the gateway indicating the transmission should be in a second facsimile coding standard. The gateway transmits according to second facsimile coding standard and the border element, using the transcoding directive in a header, converts the second facsimile coding standard information into first facsimile coding standard information. The information is then passed to the server using the first facsimile coding standard and the fax is deposited at the server.

These and other advantages of the invention will be apparent to those of ordinary skill in the art by reference to the following detailed description and the accompanying drawings.

DETAILED DESCRIPTION

At least one embodiment of the present invention allows facsimile (fax) transcoding to be dynamically invoked for devices that do not support T.38 fax protocol. In this way, a unified messaging platform can process facsimiles from endpoints (e.g., users, gateways, etc.) that are not T.38 capable (e.g., not equipped to transfer information according to the ITU standard T.38) without using DSP resources. Dynamic fax transcoding can be performed at a session border controller (SBC), allowing transcoding resources to be engaged only for non-T.38 endpoints rather than for all calls on an interface.

Figure 1:
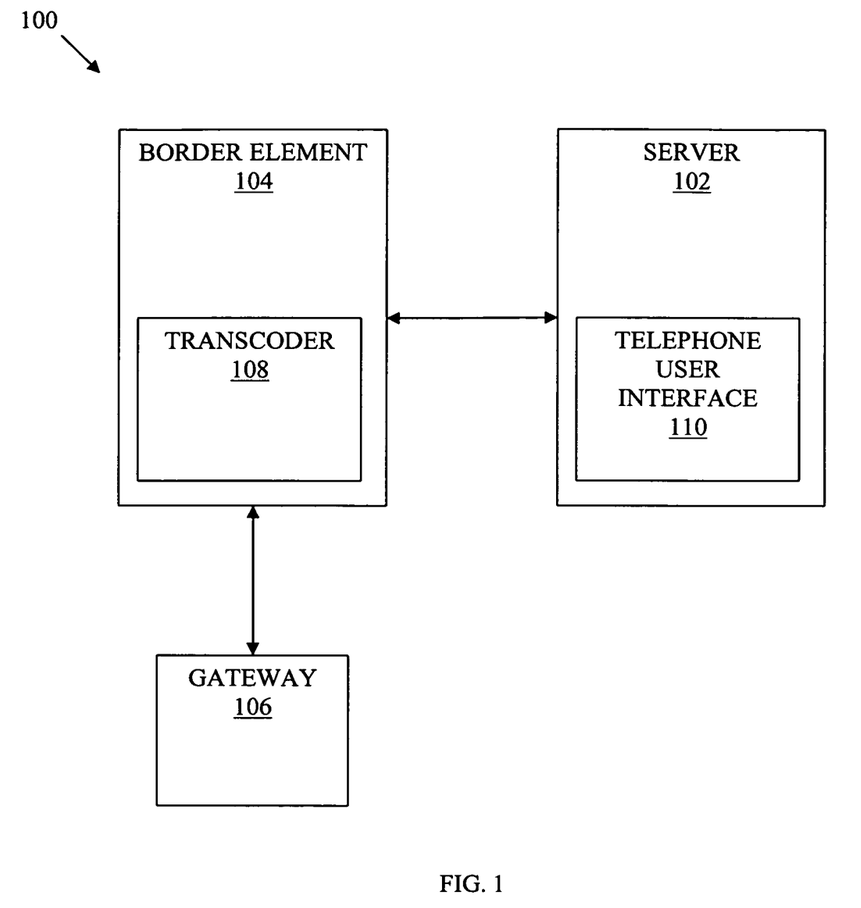
FIG. 1 depicts a facsimile transcoding system according to an embodiment of the present invention.

FIG. 1 depicts a facsimile transcoding system 100 according to an embodiment of the present invention. Transcoding system 100 includes a server 102 in communication with a border element 104, which is in communication with one or more gateways 106. In at least one embodiment, border element 104 includes a transcoder 108. In the same or alternative embodiments, server 102 includes a telephone user interface (TUI) 110. As described herein, "in communication with" describes connection between components (e.g., server 102, border element 104, gateways 106, etc.) that can transmit signals and/or information (described herein interchangeably) to each other using any appropriate protocol and combination of wired and/or wireless communication techniques (e.g., VOIP, wired, IP, etc.).

Server 102 is any appropriate server or server-like device or devices that can send and receive information from border element 104. In at least one embodiment, server 102 is a unified messaging platform. Server 102 may be implemented as a controller, such as the controller 200 discussed below with respect to FIG. 2. That is, server 102 may include and/or be a controller adapted to perform the methods described below with respect to FIGS. 3-6. Server 102 may include a TUI 110, which makes possible the interaction with other devices through a voice/speech platform in order to initiate an automated service or process.

Border element 104 is a device or group of devices adapted to connect calls (e.g., from gateways 106) to another device (e.g., server 102) and transcode, such as a server. Transcoding is direct digital-to-digital conversion from one codec (e.g., according to G.711) to another codec (e.g., according to T.38).

In at least one embodiment, border element 104 is a SBC. In such embodiments, border element 104 is a device used to exert control over the signaling and/or the media streams involved in setting up, conducting, and tearing down calls. In some embodiments, border element 104 may be implemented as a controller, such as the controller 200 discussed below with respect to FIG. 2. That is, border element 104 may include and/or be a controller adapted to perform the methods described below with respect to FIGS. 3-6.

In the same or alternative embodiments, border element 104 includes transcoder 108, which is a device that converts information from one format to another, as described in further detail below with respect to FIGS. 3-6. For example, a transcoder 108 may convert signals according to the G.711 standard into signals according to the T.38 standard.

Gateway 106 may be any device that transfers facsimile calls, such as network nodes, computers, controllers (e.g., controller 200 of FIG. 2), etc. Gateways may include analog telephony adapters (not shown) for converting analog call and/or facsimile signals into IP signals.

Figure 2:
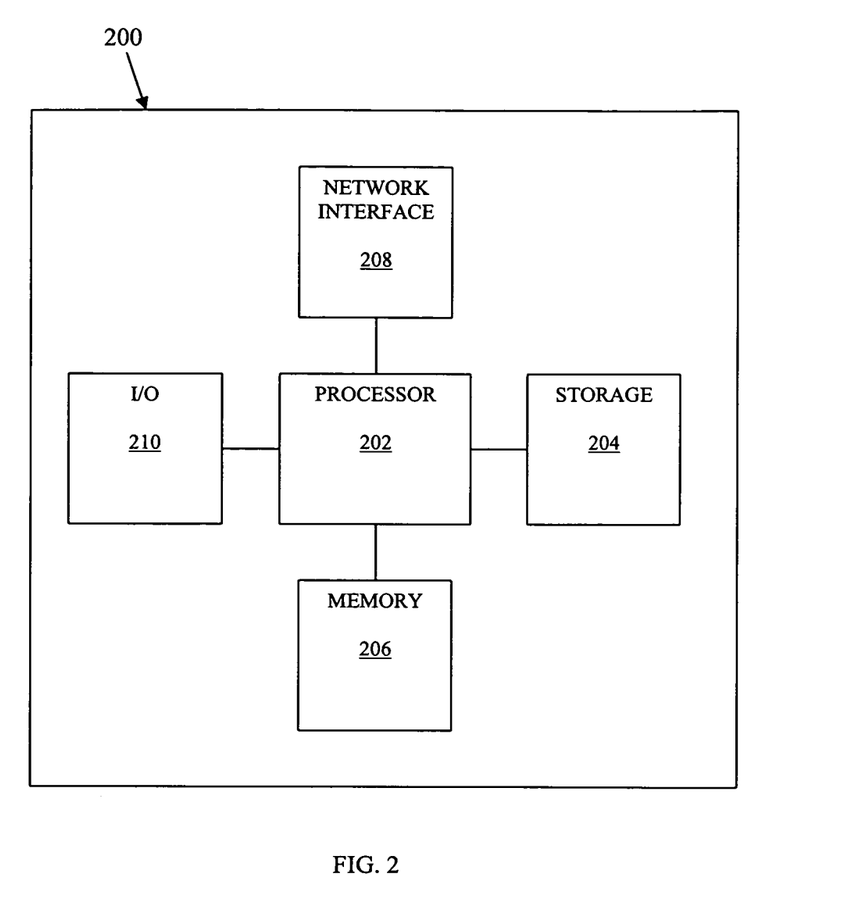
FIG. 2 is a schematic drawing of a controller.

FIG. 2 is a schematic drawing of a controller 200 according to an embodiment of the present invention.

Figure 5:
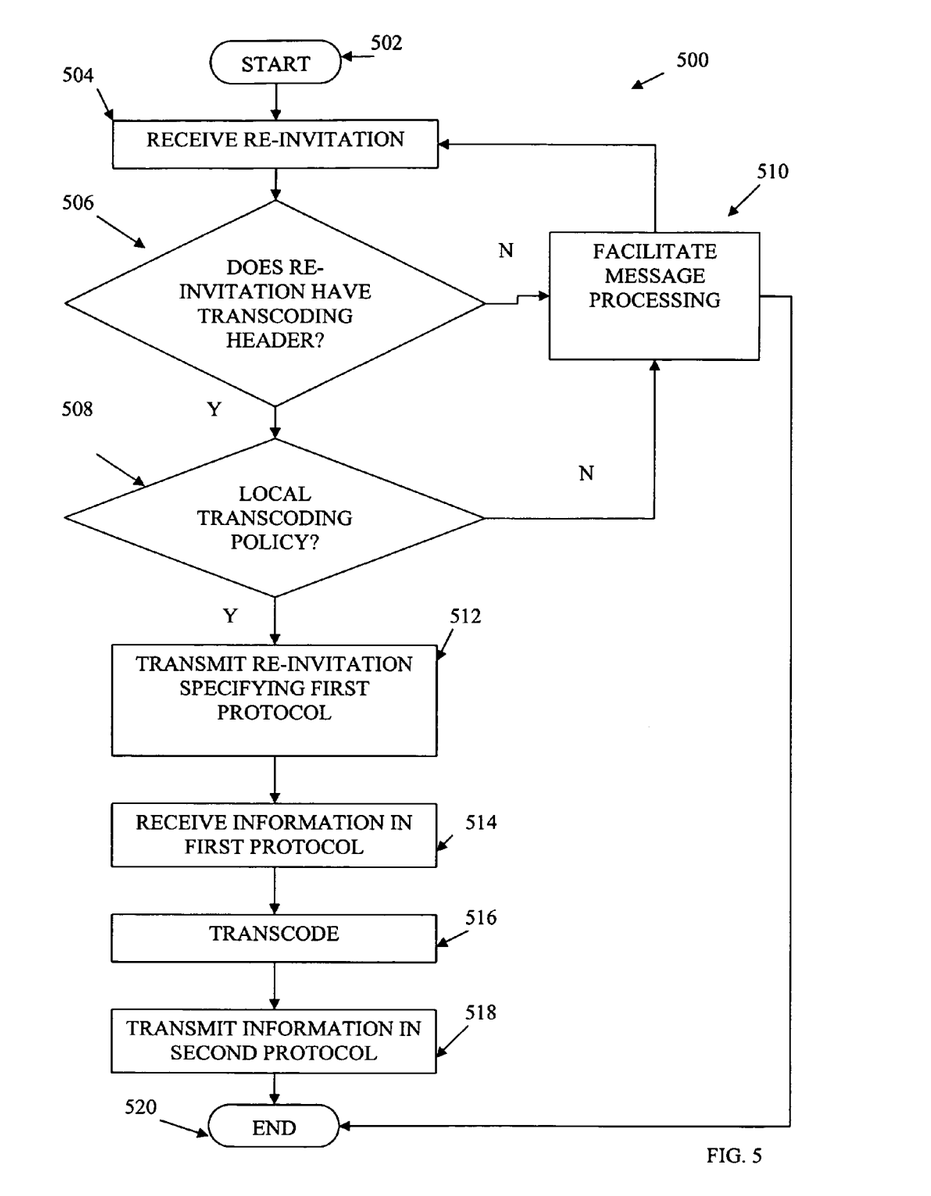
FIG. 5 depicts a flowchart of a method of transcoding at a border element according to an embodiment of the present invention.
Figure 6:
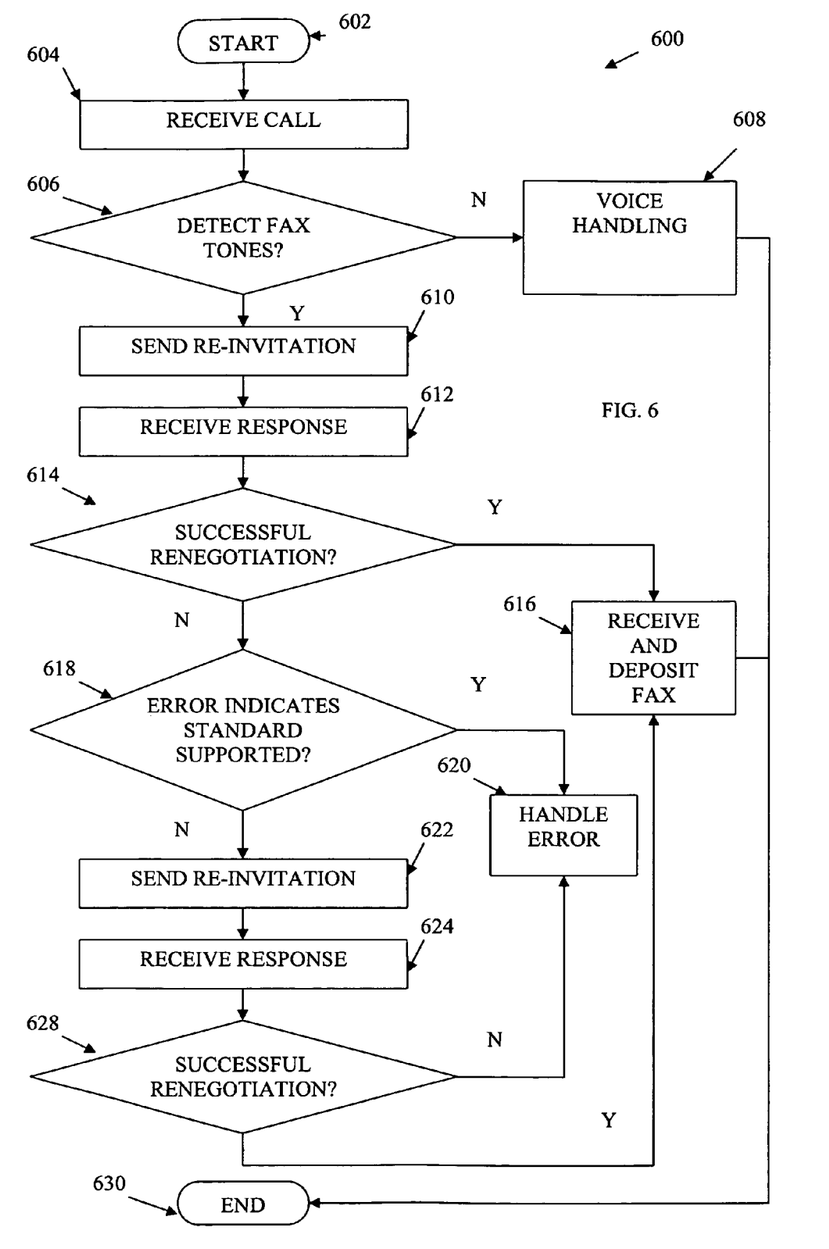
FIG. 6 depicts a flowchart of a method of transcoding at a unified messaging platform according to an embodiment of the present invention.

Controller 200 contains devices that form a controller including a processor 202 that controls the overall operation of the controller 200 by executing computer program instructions, which define such operation. The computer program instructions may be stored in a storage device 204 (e.g., magnetic disk, database, etc.) and loaded into memory 206 when execution of the computer program instructions is desired. Thus, applications for performing the herein-described method steps, such as those described below with respect to methods 500 and 600 are defined by the computer program instructions stored in the memory 206 and/or storage 204 and controlled by the processor 202 executing the computer program instructions. The controller 200 may also include one or more network interfaces 208 for communicating with other devices via a network (e.g., transcoding system 100). The controller 200 also includes input/output devices 210 that enable operator interaction with the controller 200. Controller 200 and/or processor 202 may include one or more central processing units, read only memory (ROM) devices and/or random access memory (RAM) devices. One skilled in the art will recognize that an implementation of an actual computer for use in a portable communication device could contain other components as well, and that the controller of FIG. 2 is a high level representation of some of the components of such a portable communication device for illustrative purposes.

According to some embodiments of the present invention, instructions of a program (e.g., controller software) may be read into memory 206, such as from a ROM device to a RAM device or from a LAN adapter to a RAM device. Execution of sequences of the instructions in the program may cause the controller 200 to perform one or more of the method steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 206 may store the software for the controller 200, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general purpose program elements are known to those skilled in the art, and need not be described in detail herein.

Figure 3:
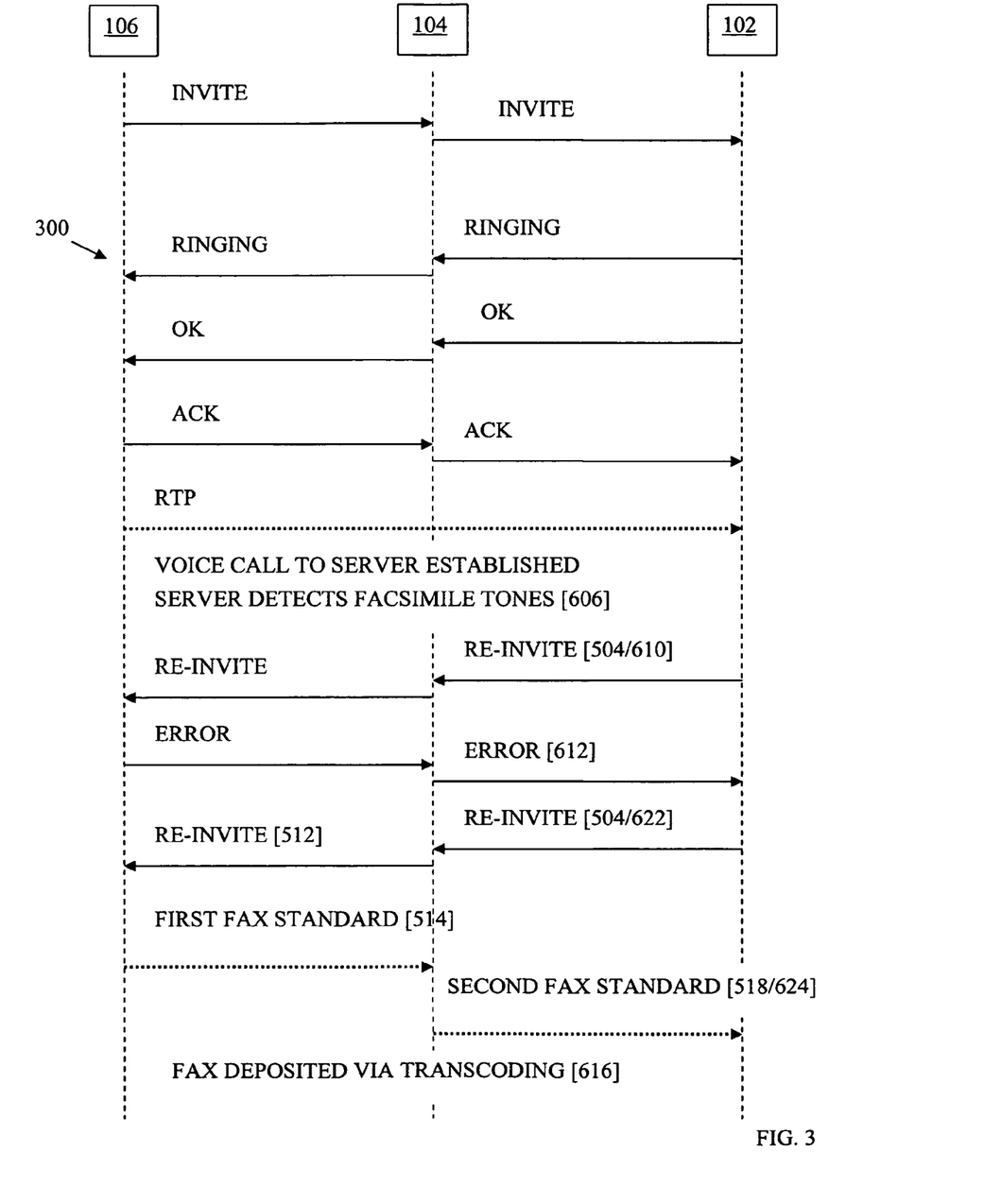
FIG. 3 is a diagram of a call flow according to an embodiment of the present invention.

FIG. 3 is a diagram of a call flow 300 according to an embodiment of the present invention. Call flow diagram 300 depicts an exemplary voice call successfully renegotiated to a T.38 facsimile call when the originating endpoint (e.g. gateway 106) does not support the T.38 standard. A session border controller (e.g., border element 104) performs dynamic transcoding in conjunction with a unified messaging platform (e.g., server 102), as discussed in further detail below with respect to FIGS. 5 and 6. Reference numerals indicating associated method steps of FIGS. 5 and 6 are shown where appropriate. These reference numerals are included to indicate how the portions of the call flow of FIG. 3 are examples of the method steps described below.

In the exemplary embodiment of FIG. 3, the gateway 106 is G.711 (e.g., the first fax standard) capable and not T.38 (e.g., the second fax standard) capable. That is, the gateway 106 in FIG. 3 is not able to transmit signals/information encoded according to the T.38 standard. As shown in FIG. 3, a call is placed in conventional fashion by gateway 106 using a real time protocol (RTP). Server 102 detects facsimile tones and re-invites gateway 106 to transfer according to the T.38 standard.

Since gateway 106 is not T.38 capable, an error message is passed to the server 102 by way of the border element 104. The server 102 then passes a re-invitation to the border element 104 with T.38 in the session description protocol (SDP) including a transcoding directive in a header. The border element 104 then sends a re-invitation, indicating the use of G.711 in the SDP, to the gateway 106. The gateway 106 transmits according to the G.711 protocol and the border element 104, using the transcoding directive in a header, converts the G.711 information into T.38 information. The information is then passed to the server 102 using T.38 and the fax is deposited at the server 102.

Figure 4:
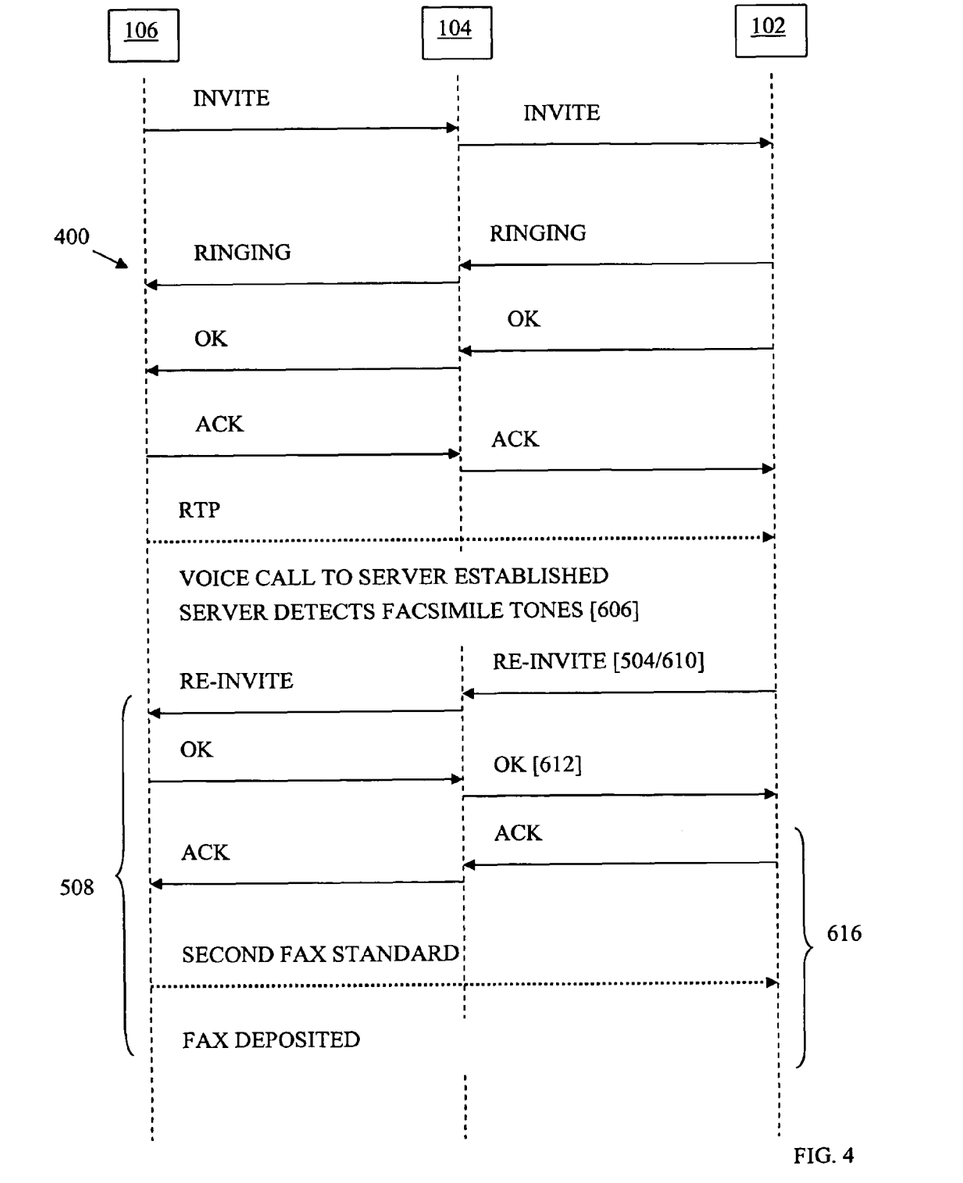
FIG. 4 is a diagram of a call flow according to an embodiment of the present invention.

In contrast to FIG. 3, FIG. 4 is a diagram of a call flow 400 according to an embodiment of the present invention. Call flow diagram 400 depicts an exemplary voice call successfully transmitted as a T.38 facsimile call when the originating endpoint (e.g. gateway 106) supports the T.38 standard. A session border controller (e.g., border element 104) facilitates transfer from gateway 106 to a unified messaging platform (e.g., server 102), as discussed in further detail below with respect to FIGS. 5 and 6. Reference numerals indicating associated method steps of FIGS. 5 and 6 are shown where appropriate. These reference numerals are included to indicate how the portions of the call flow of FIG. 4 are examples of the method steps described below.

In the exemplary embodiment of FIG. 4, the gateway 106 is T.38 (e.g., the first fax standard) capable. That is, in contrast to the gateway 106 in FIG. 3, the gateway 106 in FIG. 4 is able to transmit signals encoded according to the T.38 standard. As shown in FIG. 4, a call is placed in conventional fashion by gateway 106 using a RTP. Server 102 detects facsimile tones and re-invites gateway 106 to transfer according to the T.38 standard.

Since gateway 106 is T.38 capable, an OK message is passed to the server 102 by way of the border element 104. The server 102 then passes an acknowledgement (ACK) to the border element 104. The gateway 106 transmits according to the T.38 protocol (e.g., the second fax standard) through the border element 104 to the server 102 and the fax is deposited at the server 102. As seen here, no transcoding is necessary if the gateway 106 is already capable of transmitting according to the second fax standard.

FIG. 5 depicts a flowchart of a method 500 of transcoding according to an embodiment of the present invention. Method 500 may be performed in transcoding system 100 in general and using gateway 106, border element 104, and/or server 102 in specific. As described below, the method 500 is a method of transcoding performed by the border element 104 (e.g., a SBC). Reference is also made to the call flow diagrams of FIGS. 3 and 4 where appropriate. The method starts at step 502.

In step 504, a re-invitation to transfer information according to a protocol is received. In at least one embodiment, the re-invitation is received at the border element 104 (e.g., a session border controller). The re-invitation may be a session initiation protocol (SIP) re-invitation with a particular transmission standard in the SDP. In at least one embodiment, the transmission standard is T.38.

In step 506, a determination is made as to whether the re-invitation includes a transcoding directive. The transcoding directive is a policy, direction, indication, or command to perform transcoding. In at least one embodiment, the transcoding directive is a transcoding header as described above. In at least one embodiment, the transcoding directive is an indication in the header of a transcoding policy stored at border element 104.

If the re-invitation does not include a transcoding directive, the method proceeds to step 510 and border element 104 facilitates messaging processing as described above with respect to FIGS. 3 and 4. That is, border element 104 transmits the re-invitation, which includes instruction to transmit according to a second fax standard (e.g., T.38) to the gateway 106. If the gateway 106 is not second fax standard capable (e.g., gateway 106 cannot transmit according to T.38), it will return an error message to the border element 104. The error message will be passed to the server 102 and a new re-invitation will be received at border element 104. That is, the method 500 will return control to step 504. Re-invitation and error transmission is shown in FIG. 3 and discussed above.

Otherwise, an OK message is received from the gateway 106 and passed to the server 102. An acknowledgement (ACK) is received from the server 102 and passed to the gateway 106. The border element 104 then facilitates transmission according to the T.38 protocol to the server 102 from the gateway 106 and the fax is deposited at the server 102. The method 500 ends at step 520. As seen here, no transcoding is necessary at border element 104 if gateway 106 is already capable of transmitting according to the first fax standard. This message processing sequence is shown in FIG. 4 and described above.

If the re-invitation does include a transcoding directive, the transcoding directive is removed by the border element 104. That is, the transcoding directive in a custom header is not passed to the gateway 106, but is removed by border element 104. The method then proceeds to step 508 and a determination is made as to whether there is a local transcoding policy. Here, the determination is made at the border element 104.

If there is no local transcoding policy (e.g., a transcoding policy, method, function, etc. at border element 104), the method proceeds to step 510 and standard messaging processing is applied as described above with respect to FIG. 4. That is, border element 104 facilitates standard messaging processing as described above with respect to FIG. 4 and step 510.

If a local transcoding policy exists, the method 500 proceeds according to that policy. In a particular embodiment, border element 104 proceeds to step 512 to facilitate transcoding according to the local transcoding policy as shown in FIG. 3.

In step 512, a re-invitation is transmitted. The re-invitation is transmitted from the border element 104 to the gateway 106. The re-invitation includes an indication to transmit according to a particular protocol in the SDP. In at least one embodiment, the re-invitation includes an indication to transmit according to the G.711 standard.

In step 514, the border element 104 receives information coded according to a particular protocol (e.g., a first fax standard). In at least one embodiment, the received information is in the G.711 standard.

In step 516, border element 104 transcodes the information into another format (e.g., a second fax standard). That is, the information received in step 514 (e.g., a fax transmission according to G.711) is converted into another format (e.g., a fax transmission according to the T.38 standard). In this way, information is converted from one protocol to another protocol at border element 104.

In step 518, the transcoded information is transmitted to the server 102 in the second standard and the fax is deposited at the server 102. In this way, the border element 104 facilitates transmission of information using transcoding to allow a gateway 106 to transmit information (e.g., signals, facsimiles, etc.) according to a first protocol and a server 102 to receive the information according to a second protocol. The method ends at step 520.

FIG. 6 depicts a flowchart of a method 600 of transcoding according to an embodiment of the present invention. Method 600 may be performed in transcoding system 100 in general and using gateway 106, border element 104, and/or server 102 in specific. As described below, the method 600 is a method of transcoding performed by the sever 102 (e.g., a unified messaging platform). Reference is also made to the call flow diagrams of FIGS. 3 and 4 where appropriate. The method starts at step 602.

In step 604, a call is received at the server 102 and a check is performed to determine if fax tones are present in the call at step 606. If no fax tones are present, the method proceeds to step 608 and the call is handled as a voice call. In at least one embodiment, a voicemail is deposited at the server 102. The method then ends at step 630.

If fax tones are detected in step 606, server 102 sends a re-invitation indicating a preferred coding standard in step 610. In at least one embodiment, server 102 transmits a re-invitation attempting renegotiation to the T.38 standard. In response to the re-invitation, a response is received at the server 102 in step 612. The response may be an error message, as described above with respect to FIG. 3 or an OK message, as described above with respect to FIG. 4. In the example described herein, in response to the attempt to renegotiate to T.38, the server 102 receives an error message if the gateway 106 is not T.38 capable and an OK message if it is T.38 capable.

In step 614, a check is performed to determine if renegotiation was successful. In other words, the server 102 determines if an error message (unsuccessful renegotiation) or an OK message (successful renegotiation) was received in step 612. If renegotiation is successful, the method 600 proceeds to step 616 and a fax is received and deposited at server 102. Coordination of such a fax deposit is discussed above with respect to FIG. 4.

If renegotiation is unsuccessful, the method proceeds to step 618 and a determination is made as to whether the error indicates that the preferred standard from step 610 is supported. If the standard is supported and an error message is received in step 612, the method proceeds to step 620 and standard error handling is performed. If the standard is not supported, the method proceeds to step 622 and a re-invitation is transmitted. As described above, the re-invitation includes transcoding information (e.g., a transcoding header, indication of the preferred standard, etc.).

In step 624, a response to the re-invitation is received at server 102. In at least one embodiment, the response is information that has been transcoded from the fax standard of the gateway 106 (e.g., the first fax standard, G.711, etc.) into the preferred (e.g., second fax standard, T.38, etc.) as described above with respect to FIGS. 3 and 5. The response may be another response, such as an error message.

In step 628, a check is performed to determine if renegotiation was successful. Here, renegotiation is successful if the information received at the server 102 in step 624 is in the preferred standard (e.g., T.38 protocol). If renegotiation is successful, the method proceeds to step 616 and a fax is received and deposited. The method then ends at step 630. If the renegotiation is unsuccessful, the method proceeds to step 620 for error handling.

Though discussed above with respect to transcoding from G.711 to T.38, one of skill in the art would recognize that the transcoding operations discussed above could be applied to converting any standard, protocol, codec, or the like into another standard, protocol, codec, or the like and is not necessarily confined to facsimile transcoding in general or the G.711 and T.38 standards in particular.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of facsimile transcoding by a border element, the method comprising:

receiving, from a unified messaging platform in response to an error message from a gateway indicating an inability of the gateway to transmit according to a T.38 standard protocol, an invitation to transmit according to the T.38 standard protocol and an indication of a transcoding policy comprising direct digital-to-digital conversion from a first codec according to a G.711 standard protocol to a second codec according to the T.38 standard protocol, wherein the indication of the transcoding policy is in a header of a session description protocol of the invitation to transmit according to the T.38 standard protocol;

determining that the invitation to transmit according to the T.38 standard protocol contains the indication of the transcoding policy in the header of the session description protocol of the invitation to transmit according to the T.38 standard protocol;

transmitting to the gateway, in response to the determining and in accordance with the transcoding policy, an invitation to transmit according to a G.711 standard protocol in response to receiving the invitation to transmit according to the T.38 standard protocol, the invitation to transmit according to the G.711 standard protocol comprising the invitation to transmit according to the T.38 standard protocol with the indication of the transcoding policy in the header of the session description protocol of the invitation removed and an indication of transmission according to the T.38 standard protocol replaced with an indication of transmission according to the G.711 standard protocol;

receiving information coded according to the G.711 protocol from the gateway;

transcoding, in accordance with the transcoding policy, the information received from the gateway into information coded according to the T.38 standard protocol; and transmitting the information coded according to the T.38 standard protocol to the unified messaging platform.

2. A method of facsimile message processing at a unified messaging platform, the method comprising:

receiving an error message from a border element via a gateway, the error message indicating that transmission according to a T.38 standard protocol is unsuccessful;

transmitting to the border element, in response to the error message, an invitation to transmit information according to the T.38 standard protocol, and an indication of a transcoding policy comprising a digital-to-digital conversion from a first codec according to a G.711 standard protocol to a second codec according to the T.38 standard protocol, wherein the indication of the transcoding policy is in a header of a session description protocol of the invitation to transmit information according to the T.38 standard protocol, the invitation to transmit information according to the T.38 standard protocol being modified by the border element to:

remove the indication of the transcoding policy in the header of the session description protocol of the invitation to transmit according to the T.38 standard protocol; and replace an indication of transmission according to the T.38 standard protocol with an indication of transmission according to the G.711 standard protocol; and receiving information according to the T.38 standard protocol from the border element, the information transcoded by the border element in accordance with the transcoding policy.

3. A non-transitory computer readable medium storing computer program instructions, which, when executed on a processor, cause the processor to perform operations comprising:

receiving, from a unified messaging platform in response to an error message from a gateway indicating an inability of the gateway to transmit according to the T.38 standard protocol, an invitation to transmit according to a T.38 standard protocol and an indication of a transcoding policy comprising direct digital-to-digital conversion from a first codec according to a G.711 standard protocol to a second codec according to the T.38 standard protocol, wherein the indication of the transcoding policy is in a header of a session description protocol of the invitation to transmit according to the T.38 standard protocol;

determining that the invitation to transmit according to the T.38 standard protocol contains the indication of the transcoding policy in the header of the session description protocol of the invitation to transmit according to the T.38 standard protocol;

transmitting to the gateway, in response to the determining and in accordance with the transcoding policy, an invitation to transmit according to a G.711 standard protocol in response to receiving the invitation to transmit according to the T.38 standard protocol, the invitation to transmit according to the G.711 standard protocol comprising the invitation to transmit according to the T.38 standard protocol with the indication of the transcoding policy in the header of the session description protocol of the invitation removed and an indication of transmission according to the T.38 standard protocol replaced with an indication of transmission according to the G.711 standard protocol;

receiving information coded according to the G.711 protocol from the gateway;

transcoding, in accordance with the transcoding policy, the information received from the gateway into information coded according to the T.38 standard protocol; and transmitting the information coded according to the T.38 standard protocol to the unified messaging platform.

4. A non-transitory computer readable medium storing computer program instructions, which, when executed on a processor, cause the processor to perform operations comprising:

receiving an error message from a border element via a gateway, the error message indicating that transmission according to a T.38 standard protocol is unsuccessful;

transmitting to the border element, in response to the error message, an invitation to transmit information according to the T.38 standard protocol, and an indication of a transcoding policy comprising a digital-to-digital conversion conversion from a first codec according to a G.711 standard protocol to a second codec according to the T.38 standard protocol, wherein the indication of the transcoding policy is in a header of a session description protocol of the invitation to transmit information according to the T.38 standard protocol, the invitation to transmit information according to the T.38 standard protocol being modified by the border element to:

remove the indication of the transcoding policy in the header of the session description protocol of the invitation to transmit according to the T.38 standard protocol; and replace an indication of transmission according to the T.38 standard protocol with an indication of transmission according to the G.711 standard protocol;

and receiving information according to the T.38 standard protocol from the border element, the information transcoded by the border element in accordance with the transcoding policy.

* * * * *